Oct. 4, 1960 H. W. BODE ET AL 2,955,279

SELECTIVE PAGING SYSTEM

Filed Feb. 11, 1955 5 Sheets-Sheet 1

INVENTORS: H. W. BODE
H. J. MC SKIMIN

BY H. O. Wright
ATTORNEY

INVENTORS: H. W. BODE
H. J. McSKIMIN

BY H. O. Wright
ATTORNEY

INVENTORS: H. W. BODE
H. J. Mc SKIMIN
BY H. O. Wright
ATTORNEY

INVENTORS: H. W. BODE
H. J. MC SKIMIN
BY H. O. Wright
ATTORNEY

Oct. 4, 1960

H. W. BODE ET AL 2,955,279

SELECTIVE PAGING SYSTEM

Filed Feb. 11, 1955

5 Sheets-Sheet 5

INVENTORS: H. W. BODE
H. J. McSKIMIN
BY H. O. Wright
ATTORNEY

United States Patent Office 2,955,279
Patented Oct. 4, 1960

2,955,279

SELECTIVE PAGING SYSTEM

Hendrik W. Bode, Summit, and Herbert J. McSkimin, Basking Ridge, N.J., assignors to Bell Telephone Laboratories, Incorporated, New York, N.Y., a corporation of New York Filed Feb. 11, 1955, Ser. No. 487,686

5 Claims. (Cl. 340—164)

This invention relates to pulse code recognition circuits for use in selective paging systems, and more particularly to circuits of this type which are adapted to be conveniently carried on the person of the individual to be paged.

It is important for many people such as physicians, executives and the like to be continuously in contact with their offices or their homes. However, the nature of their work may involve frequent moving from one location to another and/or remaining out of contact with conventional prior art communication facilities for substantial periods of time. While a mobile radio-telephone would in some instances be ideal, such equipment is normally too heavy to be conveniently carried on the person and, in many instances, too expensive to be entirely satisfactory. A radio paging system is an alternative method for contacting persons having the requirements noted above. The subscriber in a radio paging system of the present invention would carry a radio receiver, including a pulse code recognition circuit, which would give an audible signal when an associated radio transmitter broadcasts a predetermined coded signal. The subscriber would then telephone or return to his office to check on the reason for the call.

A paging receiver of the invention must recognize a predetermined coded signal and responded to it and to no other signal. The coded signal is normally in the form of a group or several groups of electrical pulses. Many circuits have been proposed heretofore which recognize or identify coded pulse signals. In general, however, such circuits are too elaborate and bulky to be conveniently carried on the person, and are not adapted for various other mobile uses for the same reasons.

Accordingly, the principal object of the present invention is to simplify, and to reduce the weight and bulk of, radio receivers including pulse code recognition circuits.

Another object of the invention is to reduce the power requirements of pulse code recognition circuits.

In accordance with one aspect of the present invention, pulse code recognition circuits are simplified by the use of a common timing circuit for converting coded pulse groups into simultaneous coded signal indications, in combination with separate enabling circuits energized respectively by successive code groups applied to said timing circuit. Another aspect of the invention involves the use of pulse code groups having initial and terminal pulses forming a time frame of reference. The use of a terminal timing pulse permits the elimination of additional timing equipment which would otherwise be required at the receiver.

A feature of a number of circuits embodying the principles of the invention is the use of transistor circuitry in which the transistors are normally cut off, and draw substantial amounts of current only when the circuits are actuated. This greatly reduces the battery drain during standby intervals and facilitates the reduction in weight of the portable equipment.

Other objects and certain additional features and advantages will become apparent during the course of the following detailed description, from the accompanying drawings, and from the appended claims.

Figure 1:
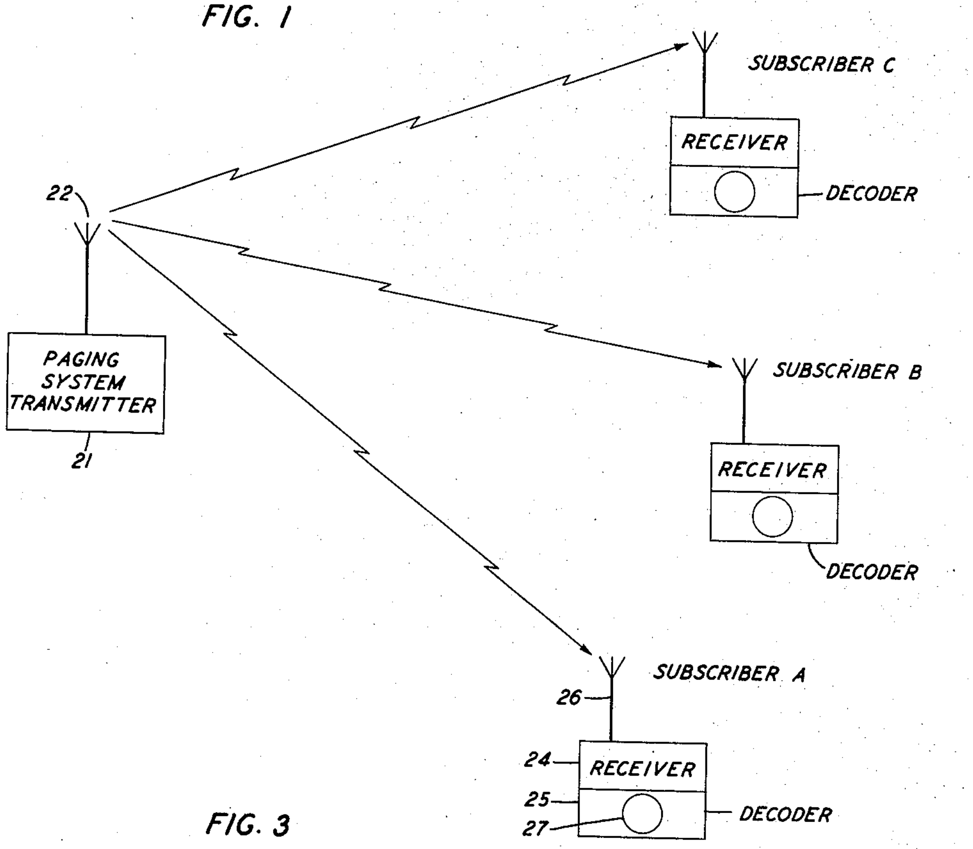
Fig. 1 is a schematic diagram of a paging system.

Referring more particularly to the drawings, Fig. 1 illustrates a paging system in accordance with the present invention. In Fig. 1, the paging system transmitter 21 transmits pulse code signals from its antenna 22. These signals are transmitted simultaneously to a large number of paging receiver units, each being associated with a particular subscriber, as illustrated, for example, by subscriber A, subscriber B and subscriber C in Fig. 1. Each subscriber has a unit which includes a receiver 24 and a decoder unit 25. These units are very compact and lightweight and may be carried in a coat pocket or in a briefcase. The receiver includes an antenna 26 which may be a single strand of flexible wire concealed in the clothing of the subscriber. The decoder is equipped with a compact loud-speaker 27 which fits into the side of the case enclosing the decoder.

The pulses may be transmitted from the paging system transmitter 21 to the receiving units of subscribers A, B and C at any suitable radio frequency, and these signals may be modulated in any desired manner. The output from the receiver 24 to the decoder 25, however, may be in the form of intermediate frequency pulses. By way of specific example, these intermediate frequency pulses may occur at two microsecond intervals, and may have a carrier frequency of fifteen megacycles per second. The fifteen megacycle frequency was selected for optimum performance of the fused silica delay lines which were employed.

Figure 2:
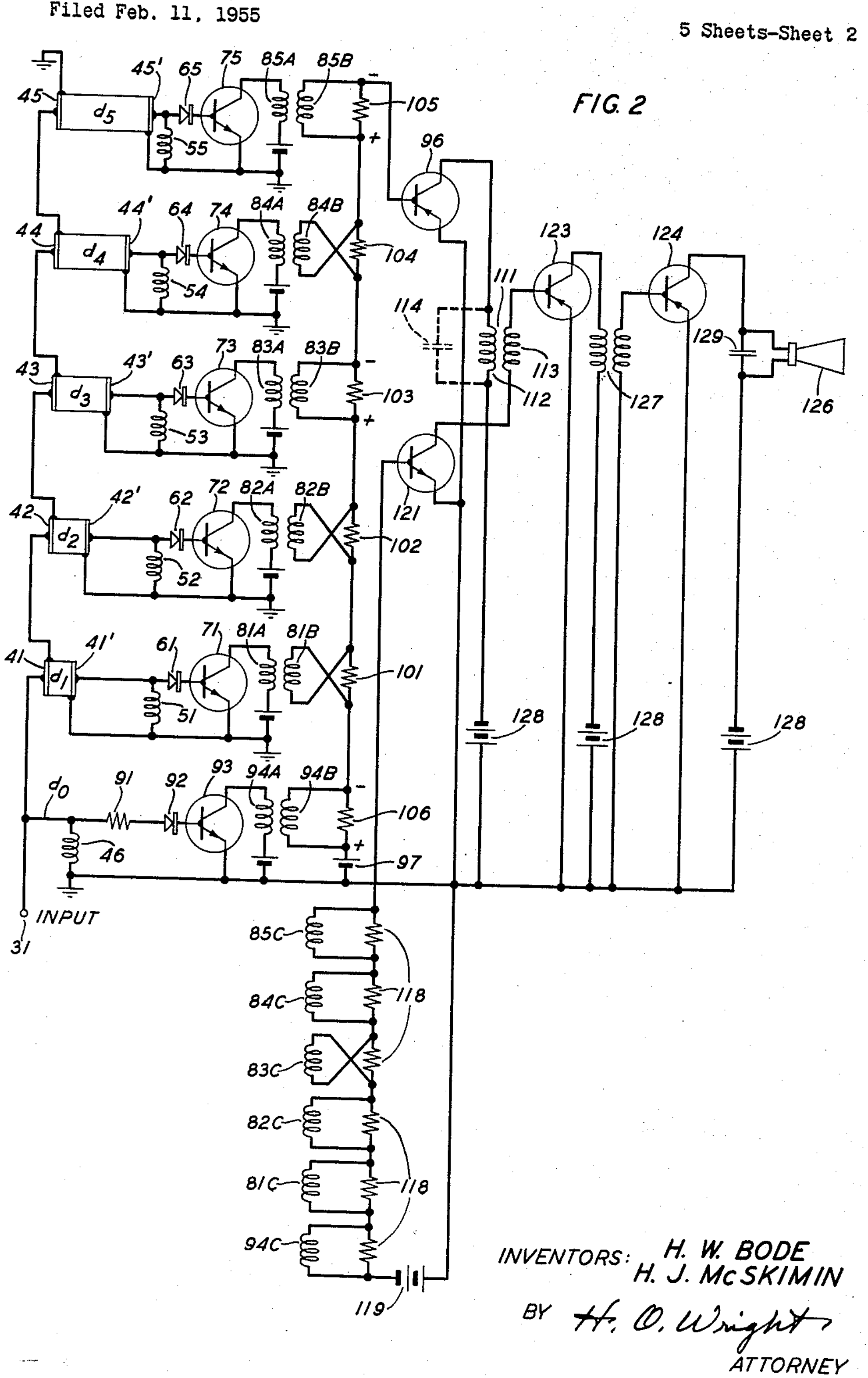
Fig. 2 is a circuit diagram of a pulse code recognition circuit in accordance with the invention.

The intermediate frequency pulses from receiver 24 are applied at input terminal 31 of the decoder unit shown in Fig. 2. By way of example, the applied groups of pulses may have the form shown at 34 and 35 in Fig. 3. The groups of pulses are applied to the delay channels $d_0$ through $d_5$, inclusive, in Fig. 2. These delay lines may be, by way of example, rods of fused silica having barium titanate transducers at each end. These electro-acoustic delay lines $d_1$ through $d_5$ delay accurately the applied signals by time intervals corresponding to the length of the rods.

The barium titanate transducers 41 through 45, inclusive, are secured to the input ends of the silica rods, and transducers 41′ through 45′ are attached to the output ends of the rods. They serve to convert electrical pulses to mechanical waves, and vice versa. The input barium titanate transducers 41 through 45 are connected in series in order to present a higher input electrical impedance to the intermediate frequency pulses applied to terminal 31. The coil 46 is provided to tune the input at terminal 31. The output impedances of the transducers 41' through 45', inclusive, are also tuned through the use of the coils 51 through 55, respectively. Intermediate frequency signals from delay lines $d_1$ through $d_5$ are then applied to the rectifying elements 61 through 65, inclusive. The rectified output from each of the diodes 61 through 65 applies a positive current pulse to the base of the corresponding N-P-N transistor 71 through 75. The current flowing in the output circuit of one of the transistors 71 through 75 produces a pulse on the primary winding 81A through 85A of the appropriate transformer 81 through 85.

Each of the transformers 81 to 85, inclusive, and 94 includes a single primary and a plurality of secondary windings. The primary windings are designated 81A to 85A inclusive, and 94A; and successive secondary windings are designated by the letters "B" and "C." Thus, the first group of secondary windings 81B to 85B inclusive and 94B are shown opposite their respective primary windings 81A to 85A, inclusive, and 94A. The second set of secondary windings 81C to 85C, and 94C, are shown below the main circuit diagram to simplify the circuit layout.

A zero delay channel $d_0$ is also provided. This channel includes the resistance 91, the diode 92, the transistor 93 and the pulse transformer 94. The purpose of the resistance 91 is to compensate for the loss in the delay lines $d_1$ through $d_5$, and thus equalize signal levels at the pulse transformers 81 through 85 and 94.

The N-P-N transistors 71 through 75 and 93 require a positive input signal to produce an output pulse. The secondaries of the transformers 81 through 85 and 94 are connected to a circuit including the transistor 96. The transistor 96 is a P-N-P transistor, and therefore requires a negative input pulse in order to produce an output pulse. The base to emitter circuit of this transistor is, however, biased three volts positive by the battery 97. The transformer secondaries 81B through 85B and 94B are respectively connected to the load resistances 101 through 106, inclusive, in the input biasing loop of the transistor 96. An appropriately poled pulse across one of the resistances 101 through 106 inserts a negative bias of 1.5 volts into the input biasing loop. Accordingly, three appropriately poled pulses from the pulse transformer secondaries 81B through 85B and 94B are required to provide net negative voltage in the loop, and to energize the transistor 96.

Figure 3:
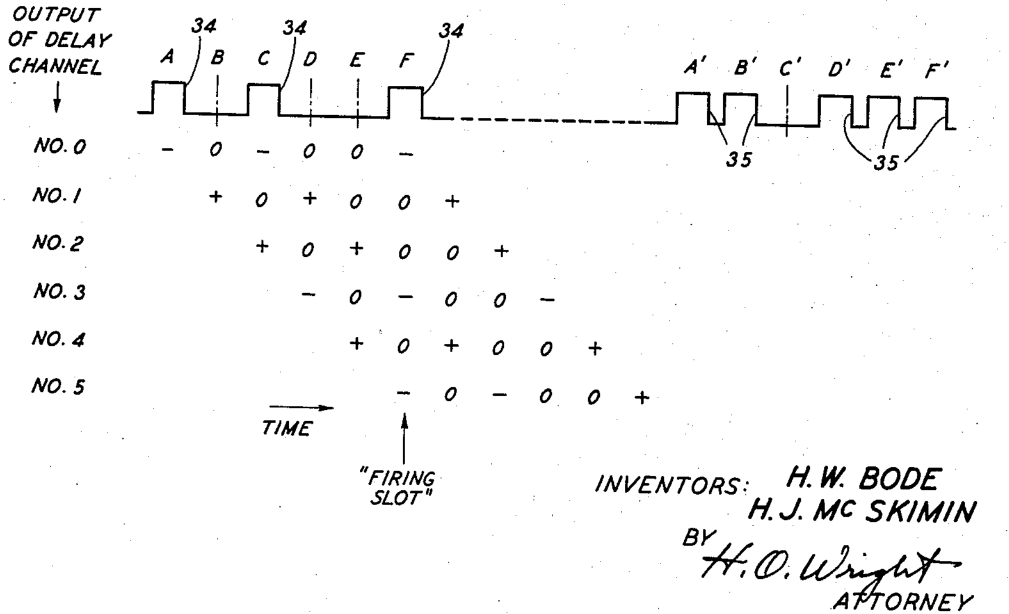
Fig. 3 is a diagram which indicates the electrical conditions at various points in the circuit of Fig. 2.

As shown in Fig. 3, the pulse code applied to the delay channels $d_0$ through $d_5$ is related to six time slots identified by the letters A through F. The initial and final pulses A and F, respectively, form a part of each pulse group which is applied to the input terminal 31 of the decoder unit. The signal information is transmitted by the presence or absence of pulses in the time slots B, C, D and E. As indicated by the pulse group 34 in Fig. 3, pulse C is the only signal information pulse present in this group of time slots B through E.

In the circuit of Fig. 2, the pulse transformer secondary windings are connected to recognize the signal pattern identified as pattern 34 in Fig. 3. Thus, the secondaries of transformers 83, 85 and 94 are connected into the series loop in such a manner as to produce voltages which tend to cancel the bias of battery 97. The secondary windings of the transformers 81, 82 and 84, however, are connected into the series loop to provide voltages which increase the bias, which prevents operation of transistor 96. This difference in polarity is shown in Fig. 2 by the direct connections of the secondaries 83B, 85B and 94B, as contrasted with the crossed connections of the secondaries 81B, 82B and 84B in their connections to the biasing circuit loop to the base of transistor 96. Thus the presence of an unwanted pulse in an otherwise correct group of code pulses produces a voltage which prevents the operation of the paging system.

In the diagram of Fig. 3, the output of each delay channel is plotted versus time. A "0" in the chart of Fig. 3 indicates the absence of a pulse at the appropriate pulse transformer, a "−" indicates a pulse at a transformer which is connected directly to its corresponding resistance in the transistor input circuit; while a "+" indicates a pulse at a transformer which is inversely connected to its corresponding resistance. With the biasing battery 97 equal to two positive increments of voltage applied to the input circuit of the transistor 96, there must be three negative pulses present at a given instant to energize transistor 96. In examining the vertical columns of "+," "−" and "0" signs in Fig. 3, it may be observed that this combination of three "−" signs only occurs during the instant labeled "firing slot," and in no other time intervals. It may also be readily determined that no other combination of pulses will energize the input to transistor 96.

When the transistor 96 is energized, a pulse is applied to the transformer 111, including the primary 112 and the secondary 113. The stray capacitance 114 resonates with the inductance of the transformer 111 and an oscillation is established. The next succeeding code group A' through F' designated 35 in Fig. 3 is applied to input terminal 31, while the oscillation associated with transformer 111 is still maintained. The transformers 81 through 85 and 94 each have two secondary windings. As mentioned above, a second group of these secondary windings is indicated at 81C through 85C and 94C in Fig. 2. The connections of these secondary windings to the resistances designated 118 in Fig. 2 correspond to the pulse pattern 35 of Fig. 3. Accordingly, when the pulse pattern 35 appears at the secondary windings 81C through 85C and 94C, the negative bias 119 associated with N-P-N transistor 121 is overcome, and this transistor 121 is also energized.

The energization of transistor 121, together with the oscillations present in transformer 111, are sufficient to energize transistor 123. This transistor in turn energizes the amplifying transistor 124, and a pulse is produced at the output speaker 126. The transformer 127 is employed to intercouple the transistor stages 123 and 124. The transformer coupling permits the use of a single battery 128 for supplying power to the collectors of transistors 96, 123 and 124. The loud-speaker unit 126 may be a small magnetic unit designed to be used in a sound powered telephone or other suitable signaling device. As indicated at 27 in Fig. 1, the speaker is mounted in the side of the decoder unit. The condenser 129 helps to match the input impedance of the speaker 126 to the output of the transistor 124. The transformers 81 through 85 and 94 may have a third set of secondary windings (not shown) connected thereto; and these may be used to provide a greater number of unique pulse combinations by the use of a third pulse code group similar to those shown at 34 and 35 in Fig. 3.

Figure 4:
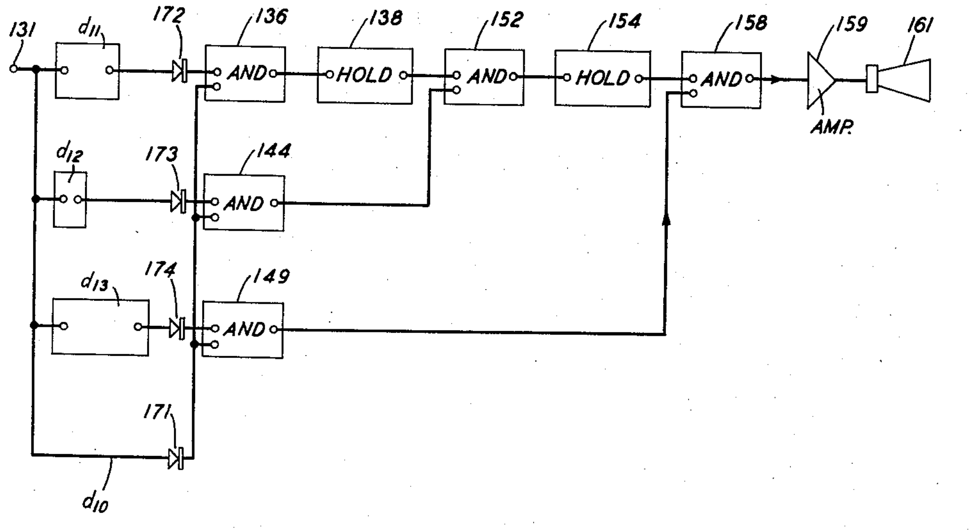
Fig. 4 is a block diagram of another form of pulse code recognition circuit of accordance with the invention.

Fig. 4 is a block diagram of another form of pulse decoding circuit. Instead of the binary coding system employed in the circuit of Fig. 2, the arrangement of Fig. 4 employs a pulse position modulation coding arrangement. For example, with the pulses being applied at input terminal 131, the delay lines $d_{11}$, $d_{12}$, and $d_{13}$ together with the "zero delay line" $d_{10}$ provide a timing circuit. This timing circuit is designed to recognize pulse patterns of the form shown in Fig. 5. For example, the spacing between pulses 133 and 134 of Fig. 5 corresponds to the delay introduced by the delay unit $d_{11}$. The diodes 171 through 174 are shown at the output of delay lines $d_{10}$ through $d_{13}$, respectively, to indicate the transformation from intermediate frequency pulses applied at terminal 131 to direct current pulses.

Figure 5:
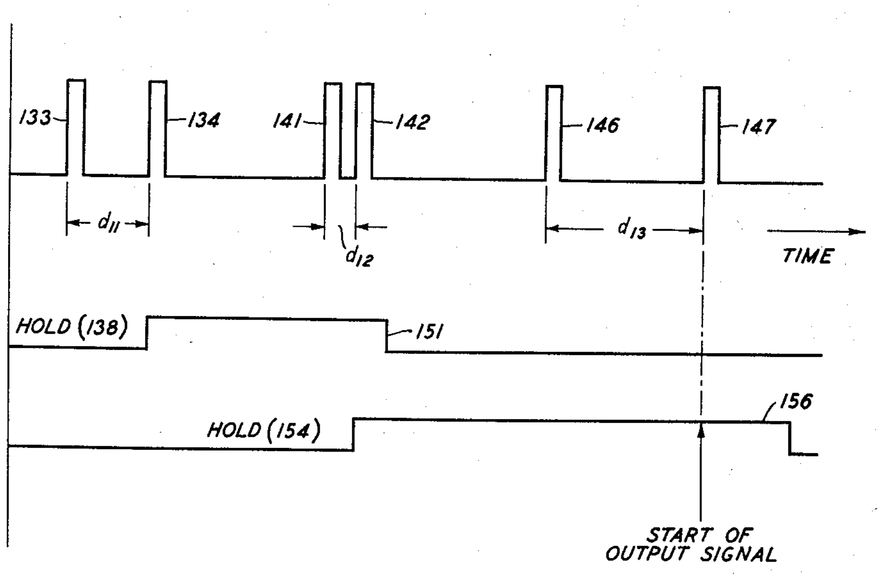
Fig. 5 is a pulse diagram indicating the relationship of pulses applied to the circuit of Fig. 4.

The gate 136 is a coincidence gate or "AND" unit, and yields an output if both input leads are energized. However, no output will be produced if only one of the two input leads of the AND unit receives a pulse. Accordingly, when the undelayed pulse 134 appears by way of the "zero delay line" $d_{10}$ at the same instant that the delayed pulse 133 appears at the output of delay unit $d_{11}$, the coincidence gate 136 will be energized, and the holding circuit 138 will be actuated. Similarly, the pulse pattern 141, 142 will energize the AND unit 144; and the pulse pattern 146, 147 of Fig. 5 will energize the third AND unit 149. The energization of the holding circuit 138 is indicated in Fig. 5 by the waveform 151. The holding circuit 138 energizes one of the inputs to the AND unit 152 for an extended period which includes the brief moment when an output pulse is produced by AND unit 144. At this moment, the hold circuit 154 is energized. The time period of the hold circuit 154 is indicated at 156 in Fig. 5. The hold circuit 154 remains energized until after the arrival of an input pulse from AND circuit 149. The concurrent energization of the two input leads of coincidence gate 158 produces an output pulse to the amplifier 159, and energizes the signaling loud-speaker 161.

Figure 6:
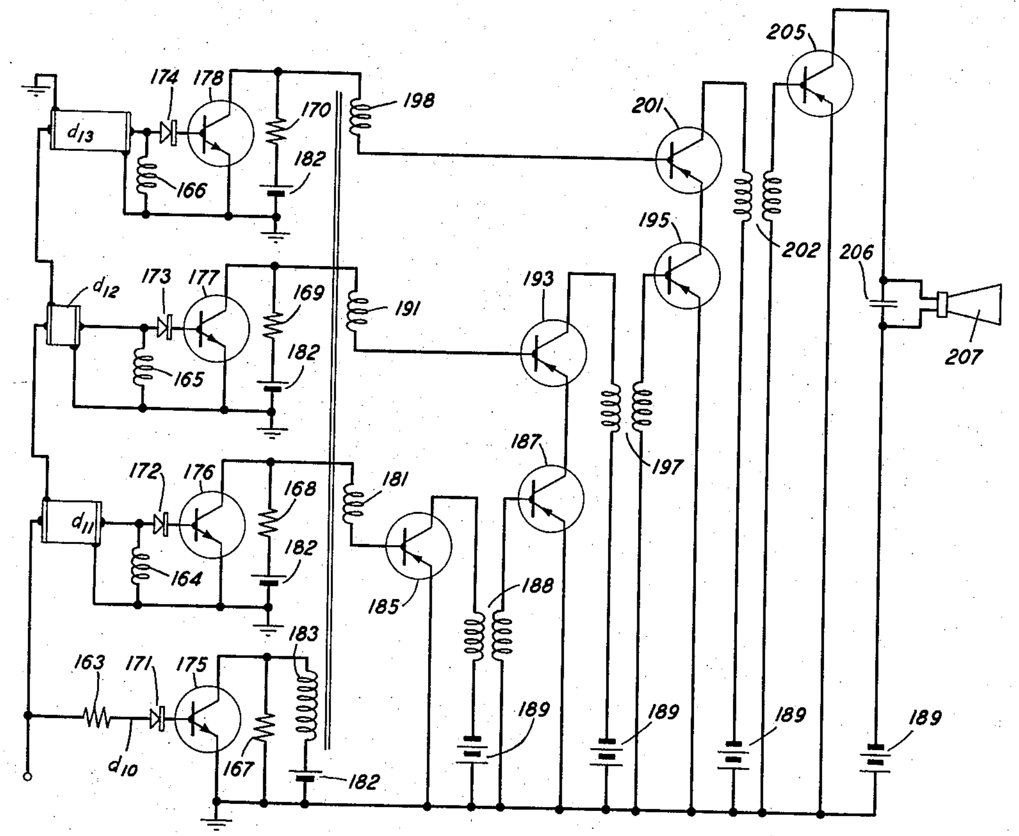
Fig. 6 is a detailed circuit diagram of the circuit of Fig. 4.

The detailed circuit diagram of Fig. 6 corresponds to the block diagram of Fig. 4. As in the case of the circuit of Fig. 2, the input pulses are applied in series to the delay lines $d_{11}$, $d_{12}$ and $d_{13}$. A resistance element 163 is again inserted in the "zero delay line" $d_{10}$ to equalize the output level of this line to that of the other delay lines. Inductances 164, 165 and 166 are provided to tune the output capacitance of the delay lines $d_{11}$, $d_{12}$ and $d_{13}$, respectively. The diodes 171 through 174 and the transistors 175 through 178 also serve the same rectifying and amplifying functions as the corresponding elements in the circuit of Fig. 2. It may also be noted that the inductances 164, 165 and 166 provide a direct current path for the rectified output of the diodes 172, 173 and 174. The output from transistors 175 through 178 is developed across resistances 167 through 170, respectively. A pulse transformer having a primary 183 and three secondaries 181, 191 and 198 plays an important part in the present circuits. The primary winding 183 is connected to the output of the zero delay circuit $d_{10}$ in the collector circuit of the transistor 175. The secondary windings 181, 191 and 198, however, are respectively connected in series with the output circuits of delay lines $d_{11}$, $d_{12}$, and $d_{13}$.

When pulses appear simultaneously at the output of transistors 175 and 176, the output developed across resistance 168, combined with the output of the secondary winding 181, is sufficient to overcome the bias of battery 182, in the base circuit of transistor 185, and the transistor is energized. The value of the biasing battery 182 is such that a pulse at the output of only one of the transistors 175, 176 is insufficient to fire the transistor 185. The energization of the transistor 185 energizes the hold circuit including the transistor 187, which will be described in detail in connection with Figs. 7 through 9. Among other functions, the transformer 188 isolates successive transistor stages, and permits the use of a single battery 189. When the second group of pulses identified as pulses 141 and 142 in Fig. 5 appear at the output of the transistors 175 and 177, the transistor 193 will be energized. The concurrent energization of the hold circuit, including transistor 187 and transistor 193, energizes the second hold circuit which includes transistor 195. The transformer 197 is also employed for holding and isolation purposes. The third group for holding and isolation purposes. The third group of pulses designated 146, 147 in Fig. 5 energizes the primary 183 at the same instant that a pulse from delay line $d_{13}$ energizes transistor 178. The combined voltage developed by the transformer secondary 198 and the load circuit 170 of the transistor 178 is sufficient to trigger the transistor 201. The output from the transistor 201 is coupled by the isolating transformer 202 to the transistor amplifying stage 205. This energizes the speaker 207, which is located in the collector circuit of the transistor 205. The condenser 206 helps to match the speaker 207 to the output circuit of the transistor 205.

Figure 7:
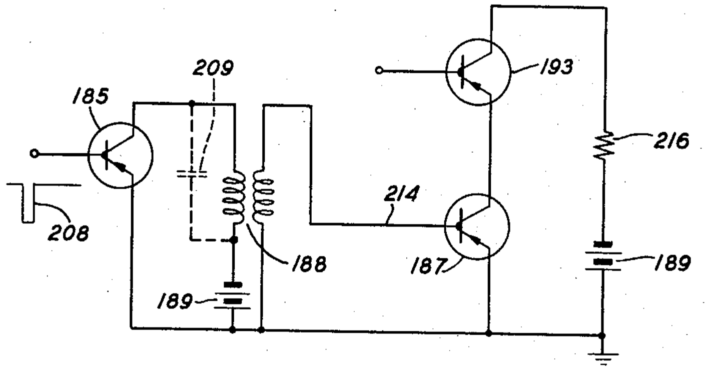
Fig. 7 is a holding circuit which is used in the circuit of Fig. 6 and which may also be employed in the circuit of Fig. 2.
Figure 8:
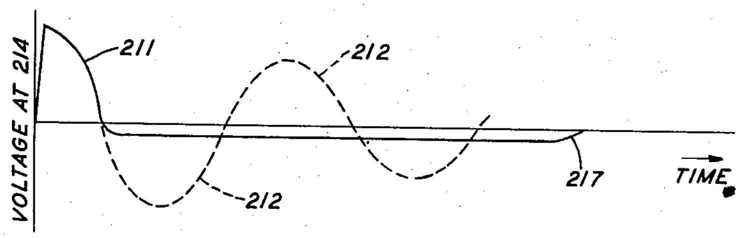
Figs. 8 and 9 are plots of the characteristics of the circuit of Fig. 7.
Figure 9:
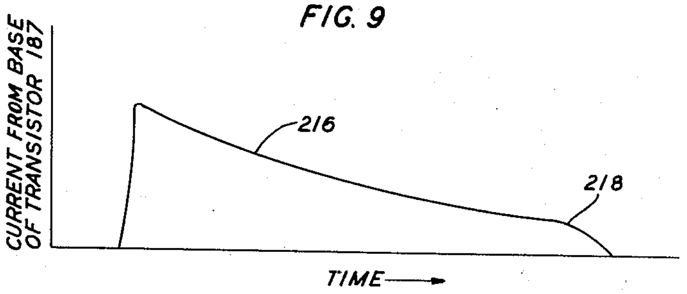

The hold circuit, including transistor 185 and transformer 188, will now be described in somewhat greater detail by reference to Fig. 7. The negative pulse required to trigger the P–N–P transistor 185 is indicated at 208. The output pulse from the transistor 185 creates a surge of current in the inductance associated with the transformer 188. The stray capacitance of the transformer and its associated wiring is indicated at 209. The oscillation which starts in the tuned circuit is indicated at 211 in Fig. 8. If the transistor 187 were disconnected from the circuit, the oscillation would continue as indicated at 212 in Fig. 8. The plot of Fig. 8 represents the voltage at point 214, which is the input lead to the base of the transistor 187. When the voltage across the base to emitter circuit of the transistor 187 is positive, this element is effectively out of the circuit. When the voltage becomes negative, however, the base to emitter circuit assumes its low resistance condition, and conducts current readily. At this instant, essentially all of the energy is in the magnetic field of the inductance, so that the ensuing decay is that of an inductance loaded with a non-linear resistance. The current flowing out of the base of the transistor 187 is indicated by the plot 216 of Fig. 9. As the current flowing out of the transistor base decreases, the base to emitter resistance increases so that the power dissipated terminates the decay rather abruptly, as indicated by the portions 217 and 218 of the solid line plots of Figs. 8 and 9, respectively.

During the period of time while current flows in the base circuit of transistor 187, a negative pulse on the base of transistor 193 energizes its load circuit, including the impedance element 216. The impedance 216 may represent another holding circuit or may represent the alert signal.

Figure 10:
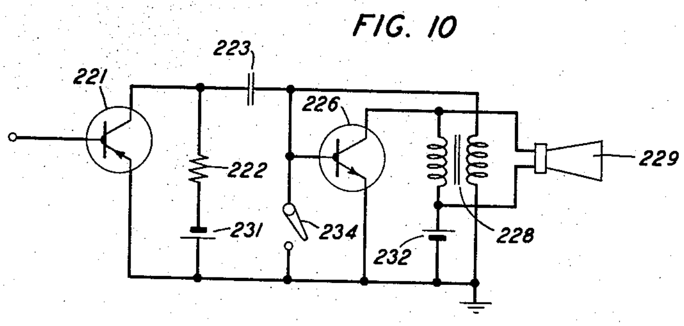
Fig. 10 is a triggered oscillator which may be used as the signaling device of Figs. 2 or 6.

Fig. 10 represents a triggered oscillator. The triggered oscillator in Fig. 10 may be employed in place of the pulse output signal circuits of Figs. 2 and 6, respectively. When the circuits of Figs. 2 and 6 are employed without the triggered oscillator of Fig. 10, the pulse code is repeated at an audio rate, and thus yields a tone output at the speaker unit. To conserve transmitter channel time, however, it may be desirable to use an oscillator such as that shown in Fig. 10 which is triggered by a single correct pulse code. The transistor 221 of Fig. 10 may correspond to the transistor 124 of Fig. 2, or to transistor 205 of Fig. 6. The output of transistor 221 is coupled by means of the resistance 222 and the capacitance 223 to the transistor 226. The transistor 226 is the active element in a transformer coupled oscillation circuit which includes the transformer 228, and the loudspeaker device 229. Power is supplied to the transistors 221 and 226 by the batteries 231 and 232, respectively. A switch 234 is provided to stop the output signal from the oscillator by grounding the base to emitter circuit of the transistor 226.

As mentioned above, one type of delay line which operated satisfactorily was made of thin rods of fused silica. Delay lines made of this material have accurate timing properties, very low acoustic loss, and do not change their delay properties substantially with temperature variations. While acoustic delay lines of the general type mentioned above are preferred, other known types of delay lines may also be employed.

The present pulse decoding circuits have been described as used in a paging system receiver. The circuits are also suitable for use as a party selection component in a mobile radio-telephone receiver. Similarly, they may be advantageously employed in any installation where the weight and power consumption of the required pulse decoding circuits should be held to a minimum.

It is to be understood that the above-described arrangements are illustrative of the application of the principles of the invention. Numerous other arrangements may be devised by those skilled in the art without departing from the spirit and scope of the invention.

What is claimed is:

1. In a portable receiver for use in a selective radio paging system, means for successively receiving a plurality of groups of selected multidigit serial binary signals, each of said groups comprising the same number of time slots, a plurality of delay line means for converting each of said serial binary signal groups into parallel binary form, a plurality of pulse transformers each having a multiple of secondary windings equal in number to the number of received binary signal groups, signal translating means coupling the output of each of said delay line means to the primary winding of a respective pulse transformer, a first enabling circuit, first circuit means connected to the output of a secondary winding of each of said pulse transformers for actuating said first enabling circuit in response to a predetermined first parallel binary code pattern, said circuit means serving further to prevent actuation of said first enabling circuit should said first binary code pattern contain a digit other than those preselected, a second enabling circuit, a second circuit means connected to the output of another secondary winding of each of said pulse transformers for actuating said second enabling circuit in response to a predetermined second parallel binary code pattern, said second circuit means serving further to prevent actuation of said second enabling circuit should said second binary code pattern contain a digit other than those preselected, a signaling device, and means responsive to the actuation of both said first and second enabling circuits for energizing said signaling device.

2. A system as defined in claim 1 wherein said first circuit means comprises a biasing means for normally biasing said first enabling circuit to a quiescent condition and a plurality of resistances each of which is respectively connected across a secondary winding of each of said pulse transformers, said resistances and biasing means being series-connected to the input of said first enabling circuit, said secondary windings being connected across said resistances in a manner such that each of the selected digits of said predetermined first binary code pattern serves to generate a voltage in said series-connected circuit which partially offsets the bias applied to said first enabling circuit, whereas digits other than those selected generate voltages in said series-connected circuit which add to the applied bias.

3. A system as defined in claim 1 wherein said first and second enabling circuits include a transistor normally biased to its high resistance state.

4. In a portable receiver for use in a selective radio paging system, means for successively receiving a plurality of groups of selected multidigit serial binary numbers, each of said groups comprising the same number of time slots, a plurality of delay line means for converting each of said serial binary signal groups into parallel binary form, a plurality of pulse transformers each having a multiple of secondary windings equal in number to the number of received binary signal groups, signal translating means coupling the output of each of said delay line means to the primary winding of a respective pulse transformer, a first enabling circuit normally biased to a quiescent condition, means series-connecting the output of a secondary winding of each of said pulse transformers to the input of said first enabling circuit, said secondary winding outputs being phased in a manner such that each of the selected digits of a predetermined first binary code pattern serves to generate a respective secondary winding output voltage which partially offsets the bias applied to said first enabling circuit and digits other than those selected generate secondary winding output voltages which add to the applied bias, a second enabling circuit, circuit means connected to the output of another secondary winding of each of said pulse transformers for actuating said second enabling circuit in response to a predetermined second binary code pattern, said circuit means serving further to prevent actuation of said second enabling circuit should said second binary code pattern contain a digit other than those preselected, a signaling device, and means responsive to the actuation of both said first and second enabling circuits for energizing said signaling device.

5. In a portable receiver for use in a selective radio paging system, means for successively receiving a plurality of groups of selected multidigit serial binary signals, each of said groups comprising the same number of time slots, a plurality of delay line means for converting each of said serial binary signal groups into parallel binary form, a plurality of pulse transformers each having a multiple of secondary windings equal in number to the number of received binary signal groups, means coupling the output of each of said delay line means to the primary winding of a respective pulse transformer, a first enabling circuit, biasing means series-connected with the output of a secondary winding of each of said pulse transformers, said series connection being connected in turn to the input of said first enabling circuit, said biasing means normally biasing said first enabling circuit to a quiescent condition, said secondary windings being coupled to said series connection in a manner such that each of the selected digits of a predetermined first binary code pattern serves to generate a voltage in said series connection which partially offsets the bias applied to said first enabling circuit and digits other than those selected generate voltages in said series connection which add to the applied bias, a second enabling circuit, a second biasing means series-connected with the output of another secondary winding of each of said pulse transformers, the latter series connection being connected in turn to the input of said second enabling circuit, said second biasing means normally biasing said second enabling circuit to a quiescent condition, the last-mentioned secondary windings being coupled to said latter series connection in a manner such that each of the selected digits of a predetermined second binary code pattern serves to generate a voltage in said latter series connection which partially offsets the bias applied to said second enabling circuit and digits other than those selected generate voltages in said latter series connection which add to the applied bias, a signaling device, and means responsive to the actuation of both said first and second enabling circuits for energizing said signaling device.

References Cited in the file of this patent

UNITED STATES PATENTS

| | | |
|---|---|---|
| 2,449,819 | Purington | Sept. 21, 1948 |
| 2,495,740 | Labin et al. | Jan. 31, 1950 |
| 2,522,609 | Gloess | Sept. 19, 1950 |
| 2,570,279 | Ridler et al. | Oct. 9, 1951 |
| 2,589,130 | Potter | Mar. 11, 1952 |
| 2,600,648 | Herrick | June 17, 1952 |
| 2,617,873 | Lovell-Foot | Nov. 11, 1952 |
| 2,670,463 | Raymond et al. | Feb. 23, 1954 |
| 2,706,810 | Jacobsen | Apr. 19, 1955 |
| 2,800,254 | Blake | July 23, 1957 |

FOREIGN PATENTS

| | | |
|---|---|---|
| 197,503 | Great Britain | May 17, 1923 |